(12) United States Patent
Kazmaier et al.

(10) Patent No.: US 10,642,807 B2
(45) Date of Patent: *May 5, 2020

(54) COLUMN STORE OPTIMIZATION USING TELESCOPE COLUMNS

(71) Applicant: SAP SE, Walldorf (DE)

(72) Inventors: Gerrit Simon Kazmaier, Heidelberg (DE); Hinnerk Gildhoff, Heidelberg (DE); Lars Volker, Karlsruhe (DE); Tim Grouisborn, Mannheim (DE)

(73) Assignee: SAP SE, Walldorf (DE)

( * ) Notice: Subject to any disclaimer, the term of this patent is extended or adjusted under 35 U.S.C. 154(b) by 365 days.

This patent is subject to a terminal disclaimer.

(21) Appl. No.: 15/680,131

(22) Filed: Aug. 17, 2017

(65) Prior Publication Data

US 2017/0344587 A1 Nov. 30, 2017

Related U.S. Application Data

(63) Continuation of application No. 14/325,262, filed on Jul. 7, 2014, now Pat. No. 9,740,719.

(51) Int. Cl.
*G06F 16/22* (2019.01)

(52) U.S. Cl.
CPC .................. *G06F 16/221* (2019.01)

(58) Field of Classification Search
None
See application file for complete search history.

(56) References Cited

U.S. PATENT DOCUMENTS

| 2003/0037059 A1 | 2/2003 | Yang |
| 2003/0132854 A1 | 7/2003 | Swan et al. |
| 2006/0215923 A1 | 9/2006 | Beatty |

OTHER PUBLICATIONS

A Nearest-Neghbor Delta Compression Method for GML Spatial Data written by Quingting Wei (hereafter Wei), Springer-Verlag Berlin Heidelberg 2013, GRMSE 2013, Part 1, CCIS 398, pp. 573-584.

*Primary Examiner* — Robert W Beausoliel, Jr.
*Assistant Examiner* — Hau Hoang
(74) *Attorney, Agent, or Firm* — Mintz, Levin, Cohn, Ferris, Glovsky and Popeo, P.C.

(57) ABSTRACT

A data set of spatial data having a plurality of dimensions and including linestrings can be processing by decomposing each linestring of the plurality of linestrings into a plurality of line segments. Each coordinate dimension appears in at least one line segment of the plurality of line segments can be listed in one of a plurality of dimensional dictionaries that each correspond to a dimension of the plurality of dimensions. A linestring of the plurality of linestrings can be represented as a set of the line segments using the plurality of dimensional dictionaries.

20 Claims, 9 Drawing Sheets

| DocID | Value ( ST_GEOMETRY ) |
|---|---|
| 1 | LINESTRING(0.0 0.0, 1.0 1.0, 1.0 2.0, 3.0 3.0) |
| 2 | LINESTRING(4.0 5.0, 1.0 1.0, 1.0 3.0, 3.0 5.0) |
| 3 | LINESTRING(1.0 5.0, 3.0 1.0, 3.0 3.0, 4.0 1.0) |

| ValueID | Value (DOUBLE) |
|---|---|
| 1 | 0.0 |
| 2 | 1.0 |
| 3 | 3.0 |
| 4 | 4.0 |

FIG. 3A

| ValueID | Value (DOUBLE) |
|---|---|
| 1 | 0.0 |
| 2 | 1.0 |
| 3 | 2.0 |
| 4 | 3.0 |
| 5 | 5.0 |

FIG. 3B

| SegmID | DocID | Start X | Start Y | End X | End Y |
|---|---|---|---|---|---|
| 1 | 1 | 1 | 1 | 2 | 2 |
| 2 | 1 | 2 | 2 | 2 | 3 |
| 3 | 1 | 2 | 3 | 3 | 4 |
| 4 | 2 | 4 | 5 | 2 | 2 |
| 5 | 2 | 2 | 2 | 2 | 4 |
| 6 | 2 | 2 | 4 | 3 | 5 |
| 7 | 3 | 2 | 5 | 3 | 2 |
| 8 | 3 | 3 | 2 | 3 | 4 |
| 9 | 3 | 3 | 4 | 4 | 2 |

COLUMN STORE OPTIMIZATION USING TELESCOPE COLUMNS

CROSS REFERENCE TO RELATED APPLICATION

This application is a continuation of U.S. application Ser. No. 14/325,262 filed Jul. 7, 2014, entitled, "COLUMN STORE OPTIMIZATION USING TELESCOPE COLUMNS" the entre disclosure of which is incorporated herein by reference.

TECHNICAL FIELD

The subject matter described herein relates to spatial data in column stores.

BACKGROUND

Column-oriented data structures serving as a basis for column-stores have recently matured into a powerful component of today's enterprise applications. Column-stores can be found as standalone in-main memory database systems (e.g. the SAP HANA platform, available from SAP AG of Walldorf, Germany), or alternatively, integrated into other types of systems, including for example business software systems such as enterprise resource planning (ERP) systems or the like. Column store based data management architectures have proven to be superior to traditional row-stores in terms of performance, in particular for online analytical processing (OLAP) analytical workloads that are common in data warehousing and business intelligence (BI) applications. One reason for this improved performance relative to previously available approaches is the ability to efficiently process (compressed) column-oriented, in-main memory data structures through hardware-optimized scans. Several recent developments have added to improvements in performance and functionality, such as transactional environments or compression techniques.

For traditional warehouse and BI applications, the primary focus in terms of information needs has been on transactional data. Such data includes information about products, manufacturers, suppliers, customers, sales and shipment transactions, and the like. While storage and query processing techniques have been highly optimized for analytical workloads operating on such data, the aspect that the majority of the data also have some geographic component has mostly been neglected. Although information about point-of-sales or customer records typically contains address information, characteristics of such data, including tailored functionality such as spatial and topological predicates, have received little attention. A typical current approach is to geocode address information and to manage respective latitude and longitude information for addresses in extra fields. This approach is also applied in conventional column-oriented data management architectures in support of BI applications. With such arrangements, geographic coordinates corresponding to addresses are managed in standard columns that simply contain floating-point numbers. In other words, geographic data is not handled in a native way but managed and queried using techniques that are employed for traditional numeric and textual data.

An intuitive approach to add spatial features to column stores is to employ some of the proven spatial index structures that are used in relational database management systems (DBMS). Viable candidates for such an approach are R-Tree variants, K-d Trees, or Quadtrees, among many other (specialized) spatial index structures. However, these index structures are mainly targeted towards efficient access to secondary storage structures and therefore focus on block-optimized read and write operations. For column-organized data managed in an in-memory database, however, such tree-based index structures are not appropriate. There are several reasons for this limitation. First, column stores gain their performance through optimized scans of vector data that is not chunked into blocks. Second, tree-based index structures like the ones mentioned above incur overhead in space and time complexity because an index itself needs to be managed. In particular, nodes in these tree structures are linked in support of search and update procedures. Thus, they do not provide for continuous scans of in main-memory structures but require following link structures.

SUMMARY

In various aspects of the current subject matter, data structures consistent with those described herein can significantly reduce the amount of computations necessary to "join" sets of geometric relationships in spatial data, which can be very computation intensive processes using conventional approaches. Linestrings can be decomposed to line segments, which can be represented as coordinates stored in dimensional dictionaries. A linestring can be represented as a set of line segment using these dimensional dictionaries.

In other possibly related aspects of the current subject matter, more complex shapes (e.g. polygonal areas, volumes, etc.) can be decomposed to simplexes having one or more dimensions. Spatial data representations of simplexes can be compressed in a similar way to those described herein for line segments (a two-vertex example of a simplex). Compressed simplex data can be rapidly scanned to identify whether other simplexes intersect (or possibly intersect) a first simplex by use of index clusters approximating coordinate values for vertices of a simplex. Index clusters designated as valid subspaces for the simplex can be used to identify those other simplexes also exist within the valid subspaces.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system, database management system, or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A common task in spatial data analysis is to compute intersections between lines. The Dimensionally Extended Nine-Intersection Model (DE-9IM) is a topological model and standard that can be used to describe the spatial relations of two regions (e.g. two geometries in two-dimensions), in fields related to computer spatial analysis. Given the interior, exterior and boundary of two geometries (e.g. geometry A and geometry B) and the intersection of the geometries with each other, DE9-IM results in a 3×3 matrix that can be used to answer all common questions regarding relations of the geometries, such as for example whether geometry A is completely within geometry B, whether geometry A overlaps with geometry B, whether geometry A intersects with geometry B, etc.

A common optimization when comparing two geometries (or parts of two geometries, such as the interior of A with the boundary of B) is to first check whether the bounding boxes of the geometries intersect (e.g. a bounding box test). However, after this has been done under a conventional approach, all of the line segments of geometry A nonetheless would still need to be compared to all of the line segments of geometry B. A line segment is two connected points, and line segments are the basic (e.g. atomic) elements of which all geometries are composed.

Finding relations in spatial data can be a computation intensive process, especially when such processes require comparing large sets of complex spatial data such as linestrings or polygons to each other. Implementations of the current subject matter utilizing data structures consistent with those described herein can significantly reduce the amount of computations necessary to "join" sets of geometries. In some examples described herein column store concepts can be applied to improve performance. For example, in some high performance, in-main memory database systems, dictionary encoding of data can be used in data compression for non-spatial data. Implementations of the current subject matter apply and extend this concept for spatial or location data, for example for directly storing line segments of geometries.

Figure 1:
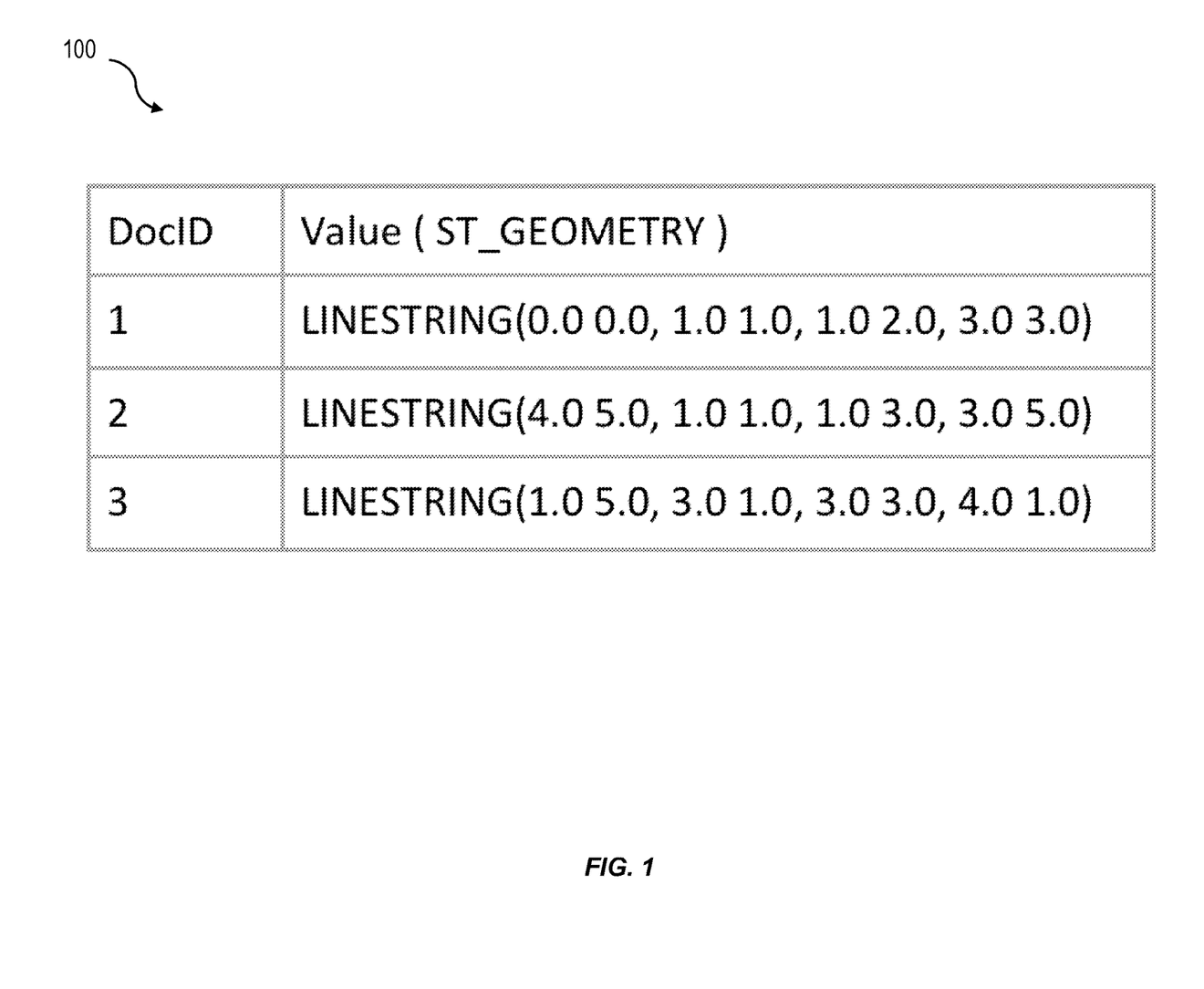
FIG. 1 shows a table listing a set of linestrings that are part of an illustrative example of features consistent with the current subject matter.
Figure 2:
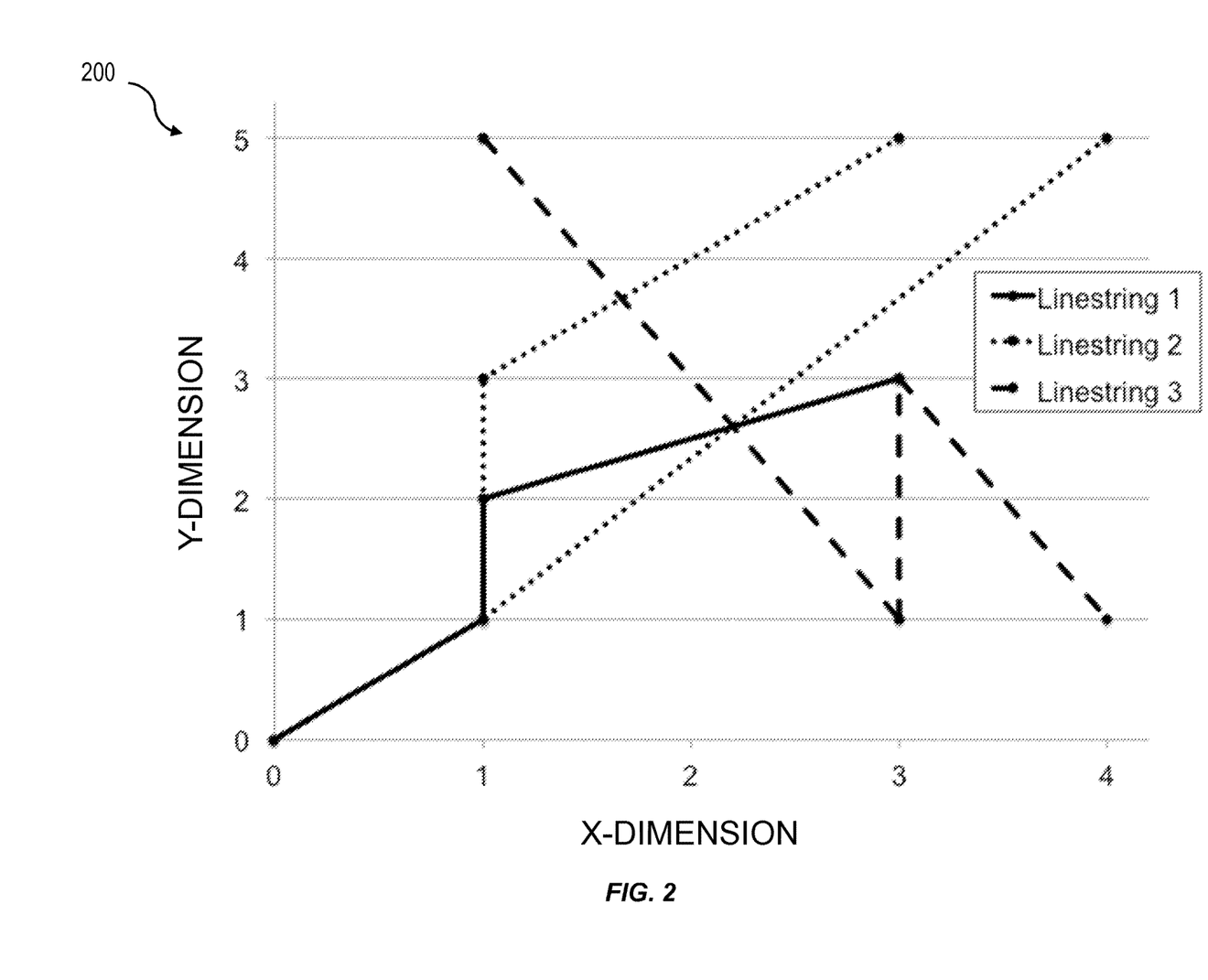
FIG. 2 shows a chart plotting the linestrings of FIG. 1 in two dimensional (e.g. X-Y) space.

Various features of the current subject matter can be better understood by reference to an illustrative, but non-limiting, exemplary set of linestrings. FIG. 1 shows a table 100 listing this example set of linestrings as a set of X, Y pairs that are connected to form each linestring. FIG. 2 shows a chart illustrating these example linestrings plotted on an X-Y chart 200.

Figure 3A:
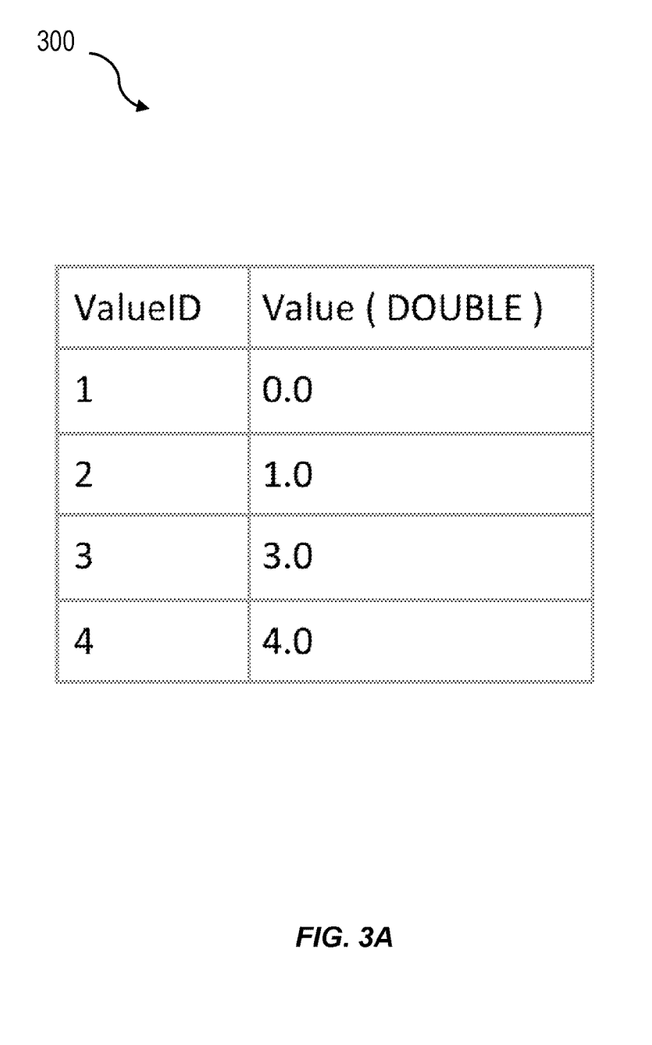
FIG. 3A and FIG. 3B show X-dimension and Y-dimension dictionary representations of the coordinates appearing in the linestrings of FIG. 1 and FIG. 2.
Figure 3B:
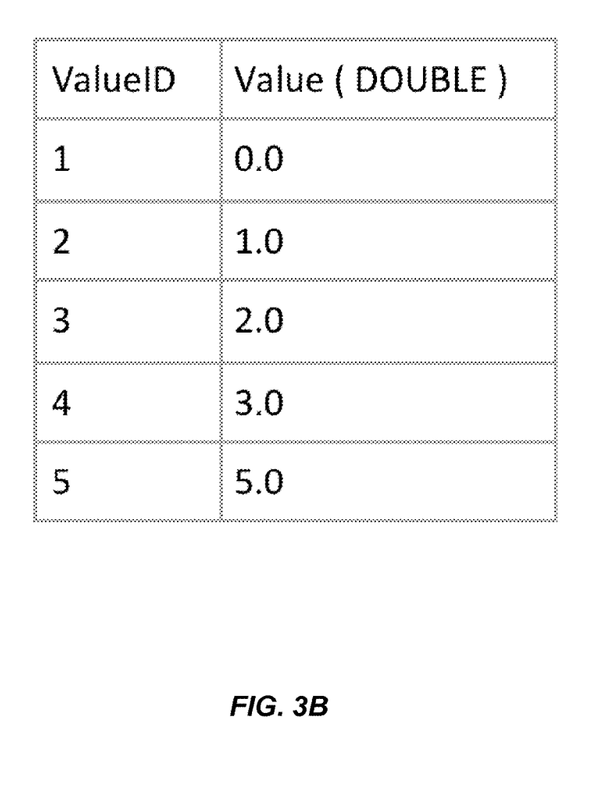

Applying a dictionary compression approach, the linestrings listed in FIG. 1 and plotted in FIG. 2 can be broken down (e.g. decomposed) into individual line segments, which can be stored in a set of dimensional dictionaries, one for each dimension. For two-dimensional data as in the current example, two dimensional dictionaries can be used to retain the X and Y coordinates, respectively, for each of the points appearing in at least one line segment of a linestring in the example set. FIG. 3A and FIG. 3B show the two dimensional dictionaries 300, 350, which list each coordinate dimension for the two-dimensional data set that includes the linestrings listed in the table 100 of FIG. 1 and illustrated graphically in the X-Y chart 200 of FIG. 2. It will be readily understood that a three-dimensional data set would have three such dimensional dictionaries, while a four-dimensional or greater data set would have a number of dimensional dictionaries corresponding to the existent number of dimensions.

Figure 4:
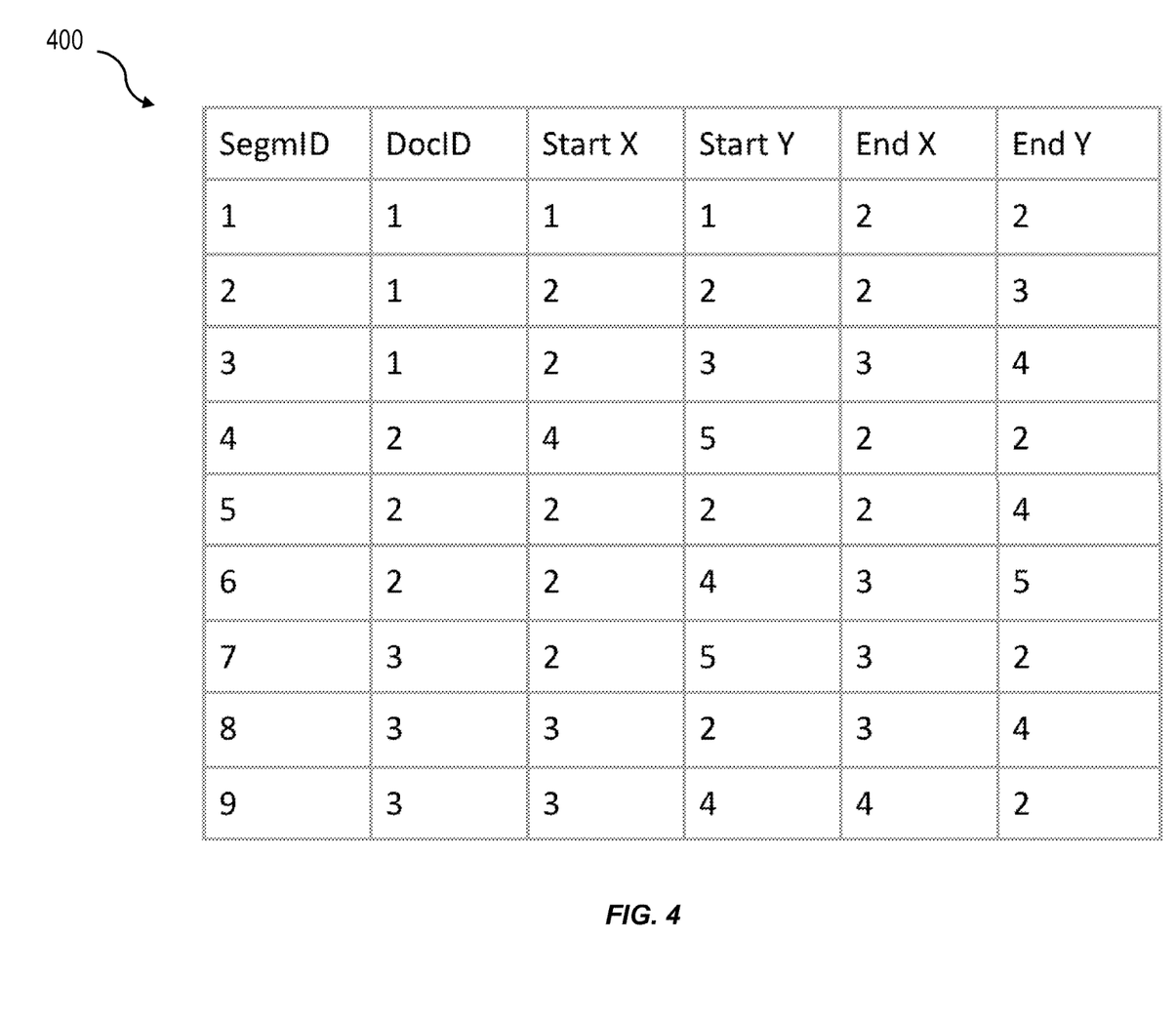
FIG. 4 shows a line segment table representing the linestrings of FIG. 1 and FIG. 2 as a set of line segments based on the dictionaries of FIG. 3A and FIG. 3B.

FIG. 4 shows a line segment table 400 illustrating how the linestrings shown in the listing 100 of FIG. 1 are represented as a set of line segments using the dimensional dictionaries 300 and 350. In the line segment table 400, the values in the docID column refer to the linestring to which the line segment defined in each row of the line segment table 400 belong. Such values can optionally be considered to be rowID values referring back to the table 100 listing the linestrings. The line segments are atomic, with each linestring being representable as a combination of one or more atomic line segments defined using the dimensional dictionaries, such as those explained with reference to FIG. 3A and FIG. 3B. Representation of line segments in this manner requires a column corresponding to each dimension for each of the start point or vertex and the end point or vertex that combine to form the line segments in the compressed data. Each line segment can then be identified by four index vectors, each indicating a position within the dimensional dictionaries 300, 350 at which the coordinate values of the start and end vertices of the line segment are stored.

Figure 5:
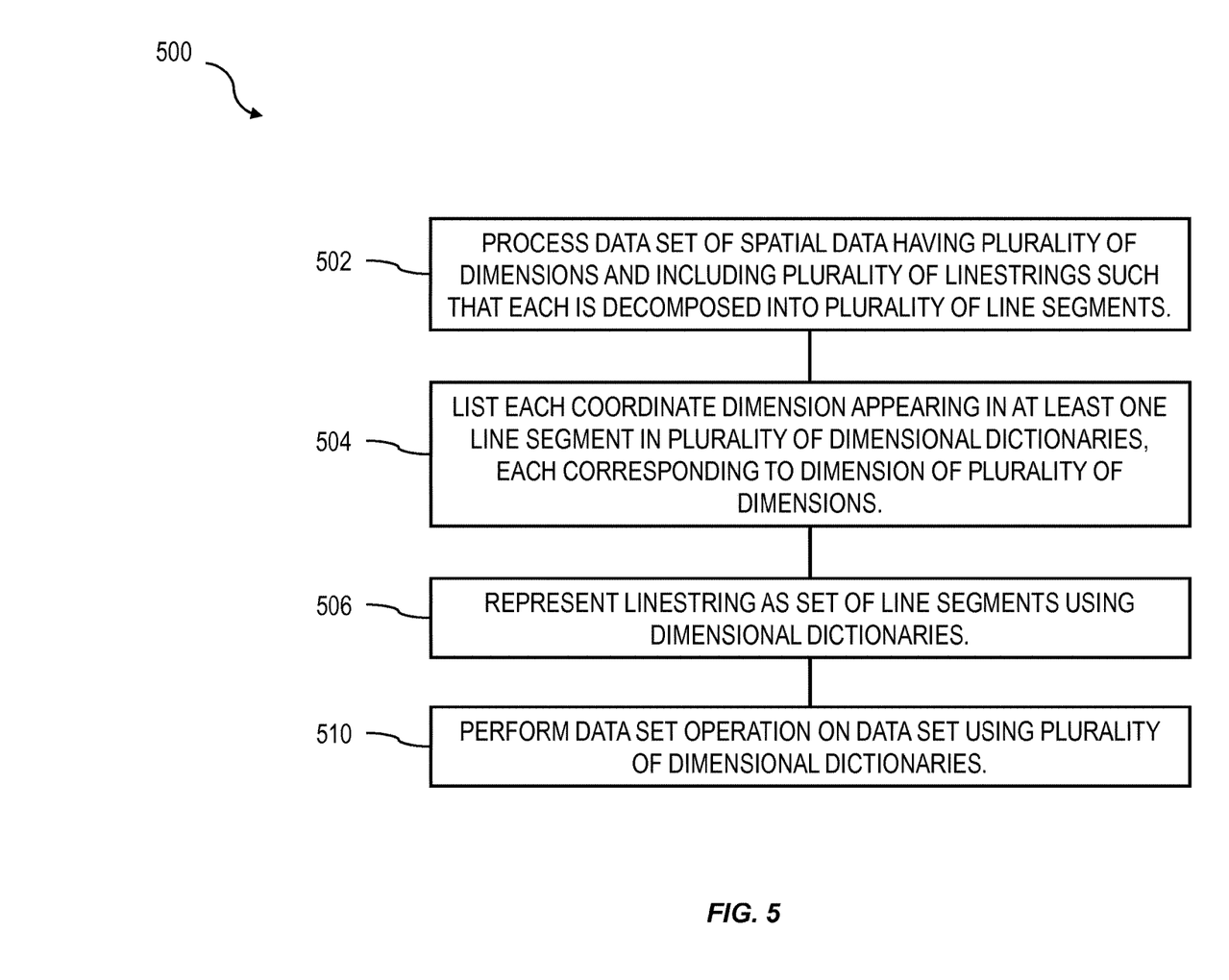
FIG. 5 shows a process flow diagram illustrating aspects of a method having one or more features consistent with implementations of the current subject matter.

FIG. 5 shows a process flow chart 500 illustrating features of a method consistent with implementations of the current subject matter. Depending on the specific implementation, one or more of the method features may be included or omitted. At 502, a data set of spatial data having a plurality of dimensions and that includes a plurality of linestrings is processed such that each linestring of the plurality of linestrings is decomposed into a plurality of line segments. A plurality of dimensional dictionaries, each corresponding to a dimension of the plurality of dimensions, lists each coordinate dimension appearing in at least one line segment of the plurality of line segments at 504. At 506, a linestring of the plurality of linestrings is represented as a set of the line segments using the dimensional dictionaries.

At 510, a data set operation is performed on the data set using the plurality of dimensional dictionaries. The data set operation can optionally include one or more of dictionary compression, a bounding box test, a polygon clipping operation (discussed in more detail below), and projection of the line segments of the linestring to a grid using a grid-join operation.

In a further, generalized implementation of the subject matter described herein, a spatial geometry (e.g. a geometry in one or more dimensions) can be decomposed into simplexes. A simplex generally refers to a generalized shape having one or more vertices, such as for example, points, line segments, triangles, tetrahedrons, and the like. An area or volume defined in a data set containing spatial data can be decomposed into a mesh (e.g. a combination) of simplexes. Such geometries have an intrinsic dimensionality and can be embedded in a space having at least the same dimensionality. The evaluation of spatial predicate queries (e.g. true or false queries about spatial relationships between geometries) can be improved by investigating the relationship of the simplexes of two geometries.

As discussed above, a dimensional dictionary can be created for each dimension (e.g., x,y,z, . . . values) of spatial data in a data set. Each dimensional dictionary stores unique coordinate values for its respective dimension. The number of index vectors referencing these dimensional dictionaries is dependent on the type of geometries to be stored. However, in general, a single column stores geometries of a same type (e.g. triangles, line segments, tetrahedrons, etc.).

A generalized representation (e.g. used for a column to store simplexes of a particular type) can include a number of index vectors per point of the type of simplex equal to the number of dimensions. For example, a column that stores two-dimensional triangles can be represented by a total of six index vectors because a triangle has three points and each point has two dimensions, each of which has its own dimensional dictionary (e.g. X, Y). When only simplexes are stored, an additional index-vector can be used to track the relation between simplexes and the represented object. An additional example is the storage of linestrings, which are composed of line segments as discussed above. A column that stores line segments in two-dimensional space can be represented by four index vectors (two points defining the line segment and two dimensions per point). Linestring data is typical for spatial database representations of linear features, such as for example pipelines, street networks, or the like.

A set of simplexes can be represented and stored consistent with the descriptions herein. With a shape (e.g. a linestring, an area, a volume, etc.) constructed of simplexes as an input, it can be desirable to identify whether any simplexes that make up the input shape intersects any other stored simplexes. Determining whether any two simplexes intersect generally requires a set of operations (e.g., dot-product and cross-product, as well as comparisons). The term "intersect" as used in reference to simplexes means that at least one edge (e.g. a line segment between two vertices of the simplex) of a first simplex is intersected by at least one edge of a second simplex. When coordinate values for the vertices of the stored simplexes are stored using dictionary compression as discussed above, they are generally unavailable for fast processing using previously available approaches. Accordingly, it can be advantageous to consider only value-IDs from the index vector. However, value-IDs (integer values indicative of positions in) may not represent the very same space and therefore generally cannot be used for the operators to identify whether the line-segments intersect.

Consistent with implementations of the current subject matter, a comparison can be performed to decide whether two simplexes intersect. This approach can include considering input variables of relevant operators as a new input space (which can in some examples have a large number of dimensions). Relevant operators are operators that lead to a final comparison operator. In this input space, there exist both valid subspaces (e.g. specific clusters of input values), where the comparison returns a true value, and invalid subspaces, where the comparison returns a false value. The relevant return value is relevant for the specific predicate evaluation.

Input clusters can be approximated (e.g. by a rectangle, box, or other shape or other volume) to represent an interval within the value-IDs in the dictionaries for the coordinate values for one of the vertices of the first simplex (e.g., the x-value from 0.5 to 1.0 which belong to the value-IDs from e.g., 12 to 400). The index vectors identifying the value-IDs for the coordinate values (e.g. x-values) for vertexes of other simplexes can then be scanned (generally very quickly) for the interval range.

After all index vectors are scanned over the input clusters and logical-or combined, a smaller set including simplexes that possibly intersect the first simplex is identified based on those index vectors that return a true value for a comparison operator with the corresponding index cluster defined for the first simplex. This approach can be especially advantageous if no exact result is required, for example if only a filtering operation during a spatial column join needs to be processed before more expensive operations are applied. For example, a first, filtering process can be performed to identify areas, volumes, etc. within a spatial data set where intersections are likely.

Figure 6:
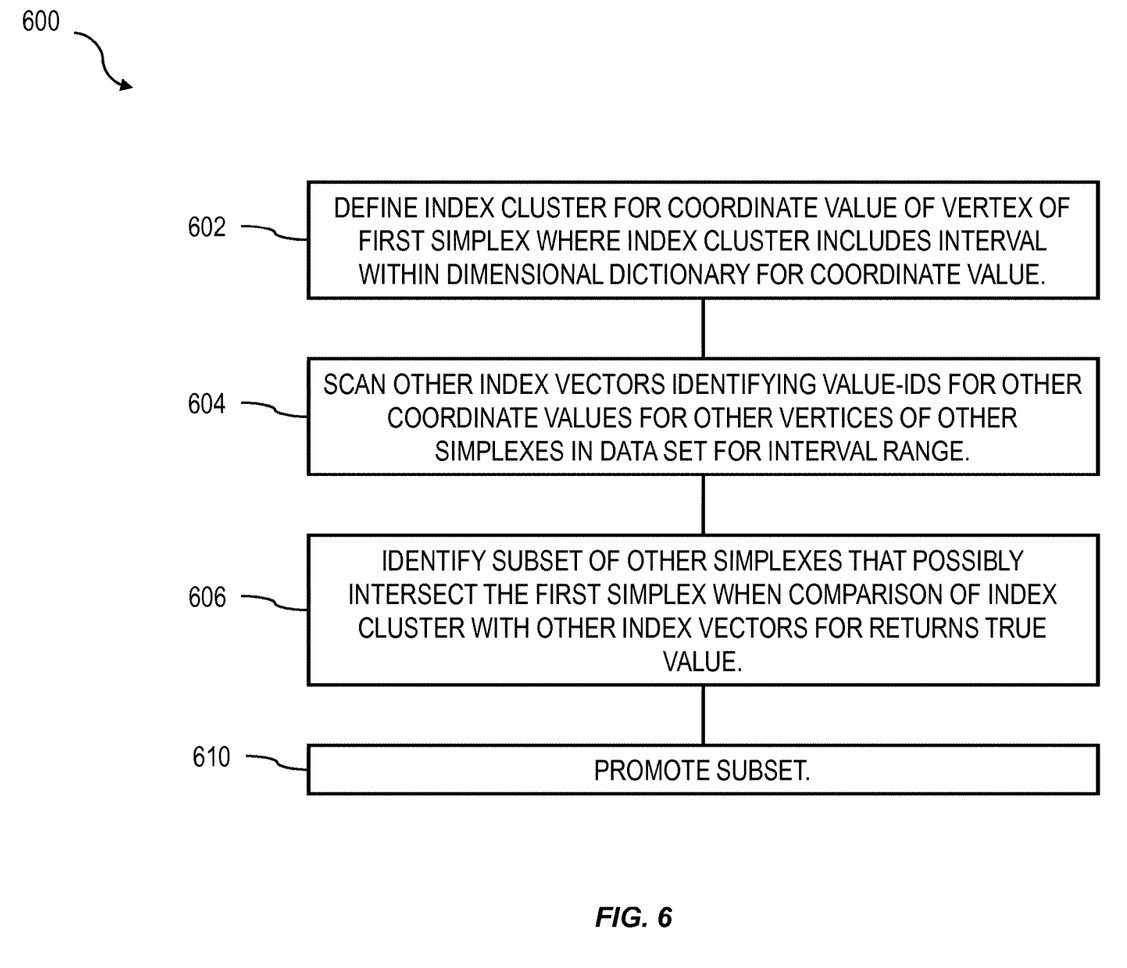
FIG. 6 shows a process flow diagram illustrating aspects of another method having one or more features consistent with implementations of the current subject matter.

FIG. 6 shows a process flow chart 600 illustrating features of a method for identifying whether one or more second shapes intersect with a first shape consistent with implementations of the current subject matter. Depending on the specific implementation, one or more of the method features may be included or omitted. At 602, an index cluster is defined for a coordinate value of a vertex of a first simplex. The first simplex includes a plurality of vertices and forms at least part of a shape within a coordinate system. A plurality of index vectors define the first simplex, where each index vector of the plurality of index vectors identifies one coordinate value within a dimensional dictionary for a dimension within the coordinate system for each vertex of the plurality of vertices. The index cluster includes an interval within the dimensional dictionary for the coordinate value. The dimensional dictionary is one of multiple dimensional dictionaries compressing a spatial data set (e.g. one dimensional dictionary for each dimension of the spatial data set).

At 604, other index vectors are scanned the interval range. The other index vectors identify value-IDs for other coordinate values for other vertices of other simplexes in a data set.

At 606, a subset of all possible other simplexes represented within the spatial data set is identified based on the scanning. The subset includes those of the other simplexes that possibly intersect the first simplex. The identifying includes designating an other simplex as a member of the subset when a comparison of the index cluster with the other index vector for the coordinate value for the other simplex returns a true value. The subset can be promoted at 610, which can include presenting the subset to a user and/or utilizing the subset as a filter result.

For example, the process represented in FIG. 6 can optionally be used as a filtering process to reduce a number of possible simplexes that intersect the first simplex. In such an example, a process for further refining an identification of possibly intersecting simplexes can include defining a new index cluster for the coordinate value of the vertex of the first simplex. The new index cluster can approximate the coordinate value within a reduced dimensional dictionary representing only the possibly intersecting other simplexes in the subset. This process can also include re-scanning the other index vectors in the subset for a new interval within the reduced dimensional dictionary for the coordinate value, and re-identifying, based on the re-scanning, a reduced subset of the other simplexes that possibly intersect the first simplex. This re-identifying includes designating possibly intersecting other simplexes as members of the reduced subset when a comparison of the new index cluster with other index vectors for the coordinate values for the possibly intersecting other simplexes in the subset returns a true value.

The approaches discussed herein can be advantageously applied for a variety of situations. For example, an intersection of two spatial data sets having complex geometries with defined line segments can be performed using a dictionary-based approach consistent with the descriptions herein. In a join, complex linestrings can be quickly identified and processed by finding all line segments that intersect using the dictionaries. As the dictionaries can be sorted, the encoding can be order preserving such that bounding box tests remain valid. Using conventional approaches, bounding box tests are generally possible only for individual line segments.

Additional advantages of the current subject matter can include the ability to efficiently compress stored value IDs. For example, only 3 bits are necessary in the example above, since the dictionaries are both smaller than $2^3$. Furthermore, scanning of line segments can be very efficient, since the data are of a single instruction multiple data (SIMD) type, which means that an algorithm can be applied to large data set by using processor instructions to scan on the value IDs. The process of projecting line segments to a grid can also be improved relative to conventional approaches, which can be beneficial for a grid-join operation.

In one example use of aspects of the current subject matter, a polygon clipping process can be improved. In such a scenario, it can be desirable to show or process a polygon without fully processing the polygon. The process of computing a subset of two polygons is called clipping. For example, it may be desirable to draw a polygon on the screen, but to query only the part from the database, which would be visible. Especially for complex polygons, such an approach can speed up query time.

When clipping an ordinary persisted polygon, that is, a sequence of paths, it is usually necessary to split the polygon and to handle each part accordingly. However, for a polygon stored in telescope columns consistent with implementations of the current subject matter, this operation is not required, thereby resulting in a speed up in processing.

With an in-main memory, high-speed database management system using features consistent with the current disclosure, it can be possible to access multiple columns in parallel and to clip them against another polygon. According to the kind of polygon against which clipping is being performed (concave, convex, rectangle) a different clipping algorithm can be chosen.

The approaches discussed above can be seamlessly integrated into any column store system, such as for example an in-main memory high performance database system. As an illustrative, non-limiting example, the following description of an overall architecture, update handling, dictionary coding principles, and memory scan optimizations of such a system is provided with reference to FIG. 7 and FIG. 8.

Figure 7:
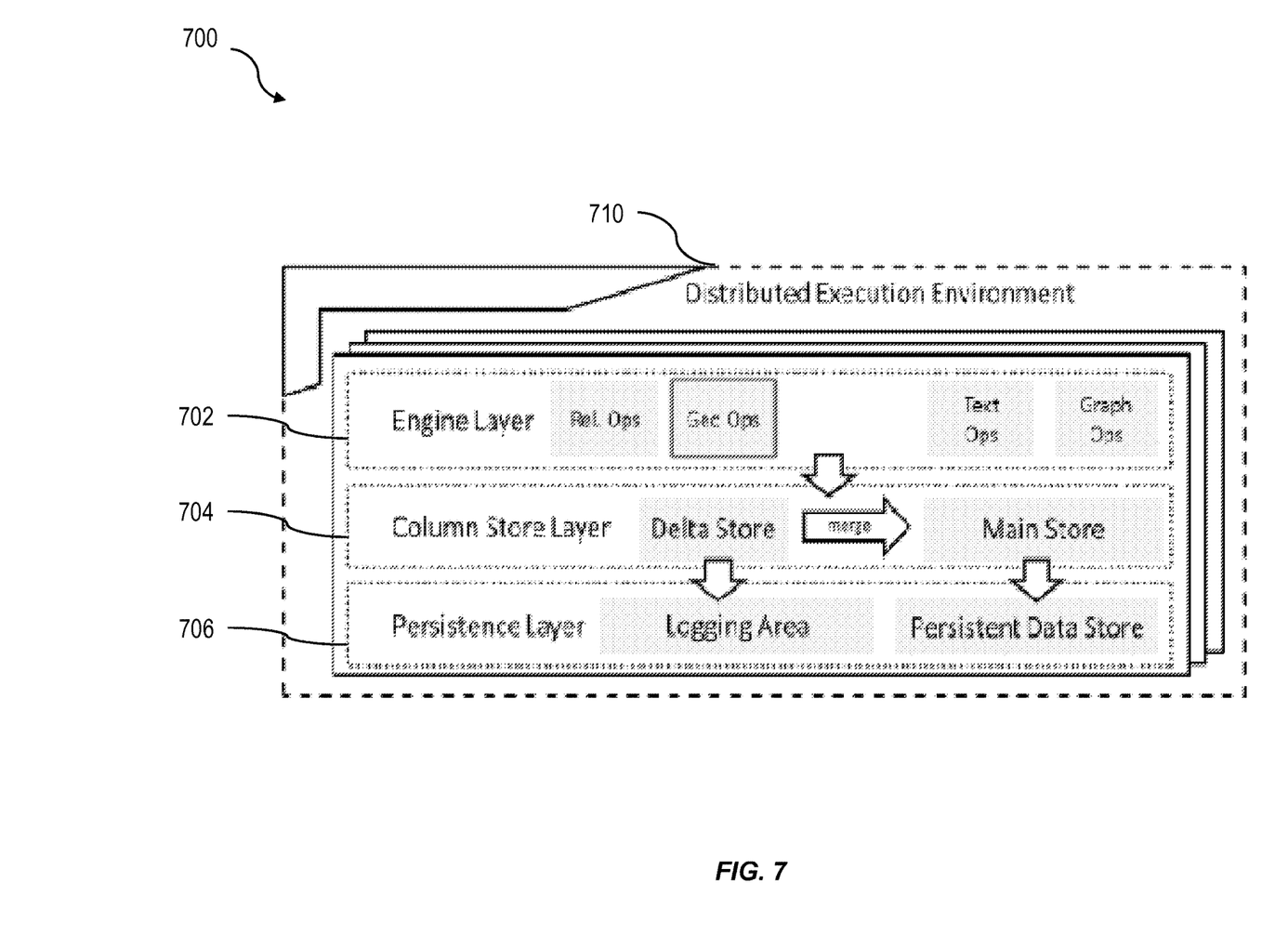
FIG. 7 shows a diagram illustrating a database environment including a column store.
Figure 8:
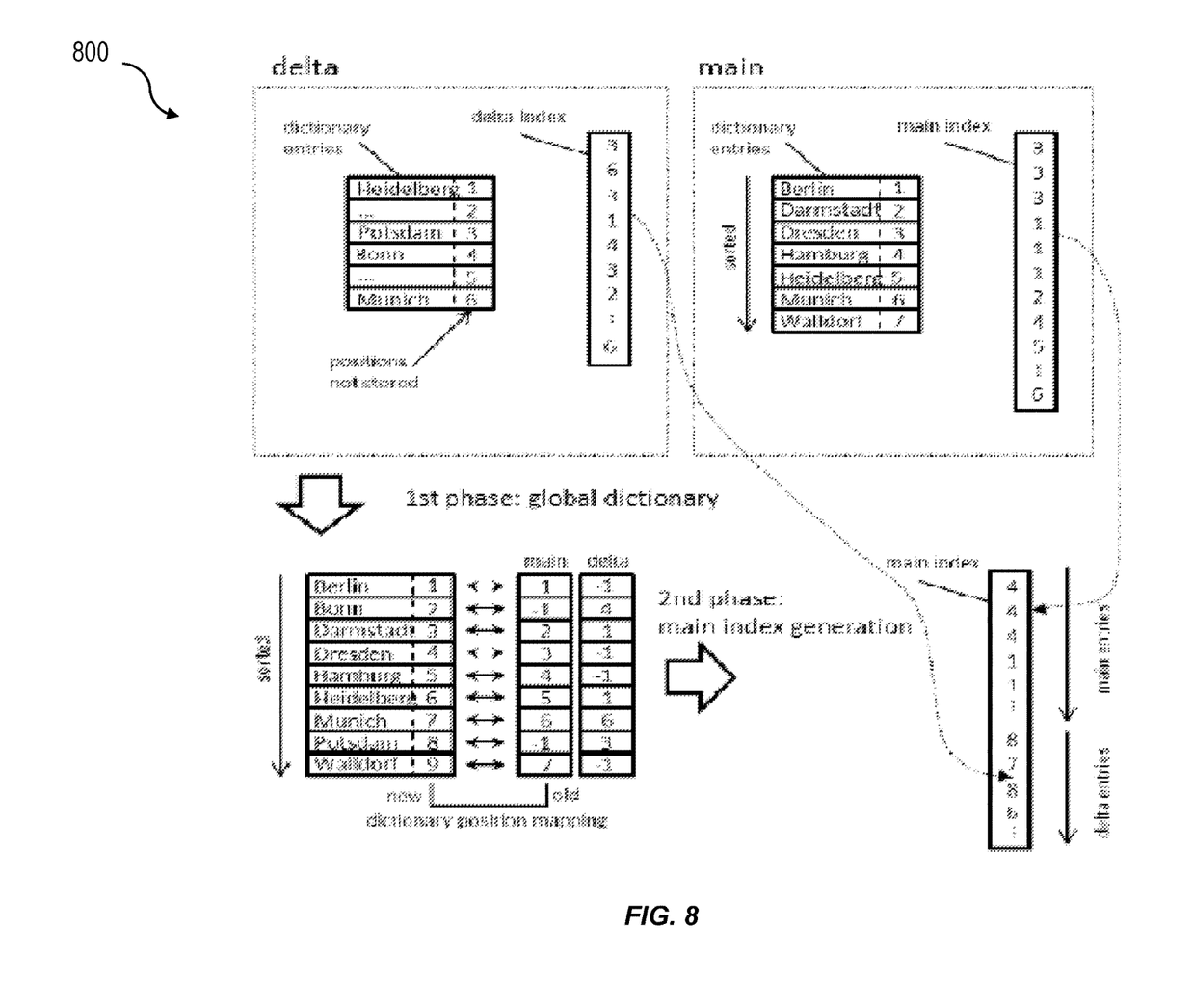
FIG. 8 a diagram illustrating data dictionaries and a corresponding bit compressed vector.

FIG. 7 shows a diagram 700 illustrating a layered architecture of an example of such a system, in which the database distinguishes between compile time and run time of a database request similarly to classical systems. As shown in FIG. 7, the layers can include an engine layer 702, a column store layer 704, and a persistence layer 706. Multiple components, such as a transaction manger, an authorization manager, a meta data (replication) manager, session management, etc., can be clustered around a distributed data flow execution environment 710. Within this environment, different sets of plan operators provide an abstraction from a column-oriented storage model to a corresponding data model. The engine can support a wide range of different set of operators ranging from relational operators (for the core SQL data model) to text or graph processing operators (e.g. for more elaborated and partially domain and vendor-specific data models). The general architectural design decouples the access primitives of the storage system from the different model-specific views on the data. The set of geo operators providing the functionality of geo-aware methods on top of geo-agnostic data structures complements this set of plan operators and automatically takes advantage of all functional and non-functional characteristics of the column store layer.

The column store layer 704 provides a transactionally consistent view to the engine layer 702 following the multi-version concurrency control (MVCC) principle. All operations of a query on top of this layer are transparently embedded into a sphere of control with access only to the correct underlying version of data.

The database also includes a write-optimized delta store and a read-optimized main store. All data modifications are reflected within the delta store, e.g., inserts of new versions of existing entities are represented within the delta. Deletes are either directly reflected in the delta or signaled via an additional bit-vector for the main store. As the delta grows over time, a merge process eventually moves delta entries to the read-optimized main structure. Modifications coming from the user or directly within the system can be encapsulated within the column store layer 704 and transparent for the engine layer 702.

A column store engine can apply dictionary encoding to all columns, independent of their cardinality of number of distinct values. As shown in diagram 800 of FIG. 8, a column then results in two data structures: a dictionary, which maps the user-values to Value IDs, and a bit compressed vector with Value IDs representing the columns of the original table. Due to frequent modifications and its temporary characteristics, the dictionary of the delta is unsorted. The dictionary of the read-optimized main, however, is sorted with respect to the user values. A merge then includes two phases. In a first phase, a new dictionary is constructed, consolidating the entries of the main and delta dictionaries and generating new Value IDs. In a second phase, the main bit compressed vectors are recreated by physically generating a new image of the bit compressed vector that includes the old entries (ignoring deletes) and new entries of the delta. Numerous highly optimized versions of the process exist to speed up the merge process for specific scenarios. Again, the layer above does not notice such internal and asynchronous reorganization steps. This database design can provide a basis for a seamless integration of data-model specific operators relying on core column store data structures. All updates, reorganizations, efficient scan implementations, etc. can be completely transparent for the engine layer 702 and can be exploited via well-defined scan methods. This arrangement allows for easy adoption of the techniques and transfer into other columnar systems.

Figure 9:
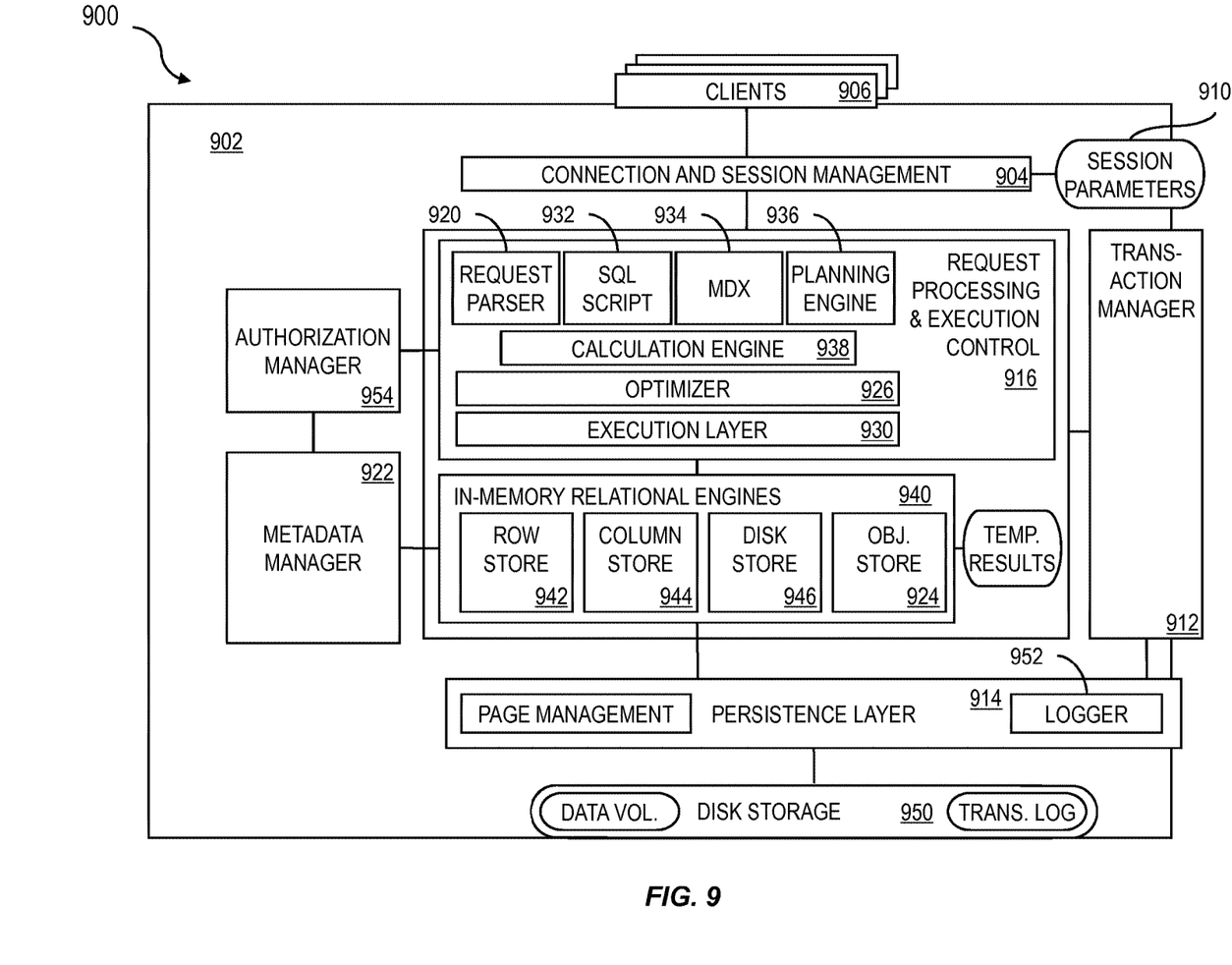
FIG. 9 shows a diagram illustrating aspects of a system showing features consistent with implementations of the current subject matter.

FIG. 9 shows a block diagram of an in-memory relational database server 900 consistent with some implementations of the current subject matter. A connection and session management component 902 of an in-memory database system 904 creates and manages sessions and connections for the database clients 906. For each session a set of parameters 910 is maintained such as for example auto commit settings or the current transaction isolation level. Once a session is established, database clients 906 can use logical (e.g. SQL) statements to communicate with the in-memory database system 904. For analytical applications the multidimensional query language MDX can also be supported.

Each statement can be processed in the context of a transaction. New sessions can be implicitly assigned to a new transaction. A transaction manager 912 can coordinate transactions, control transactional isolation, and keep track of running and closed transactions. When a transaction is committed or rolled back, the transaction manager 912 can inform the involved engines about this event so they can execute necessary actions. The transaction manager 912 can cooperate with a persistence layer to achieve atomic and durable transactions.

Requests received from the database clients 906 can be analyzed and executed by a set of request processing and execution control components 916, which can include a request parser 920 that analyses a request from a database client 906 and dispatches it to a responsible component. Transaction control statements can, for example, be forwarded to the transaction manager 912, data definition statements can be dispatched to a metadata manager 922 and object invocations can be forwarded to an in-memory object store 924. Data manipulation statements can be forwarded to an optimizer 926, which creates an optimized execution plan that is provided to an execution layer 930. The execution layer 930 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 932, which is based on side effect free functions that operate on tables using SQL queries for set processing, can be used to enable optimizations and parallelization. The MDX language 934 can be used to provide support for multidimensional queries. A planning engine 936 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 932, MDX 934, and planning engine 936 operations can be implemented using a common infrastructure called a calculation engine 938. Metadata can be accessed via the metadata manager component 922. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 922.

One or more relational engines 940, for example an in-memory row store 942, an in-memory column store 944, a disk-based store 946, and the in-memory object store 924 mentioned above can communicate with the request processing and execution control components 916, the metadata manager 922, and the in-memory persistence layer 914. The row store 942 and column store 944 are each relational in-memory data engines that can store data in a row-based or column-based way, respectively. Some data, such as for example tracing data, need not be kept in memory all the time. The disk-based store 946 can handle such data. Data in the disk-based store 146 can be primarily stored in disk storage 950 and only moved to memory buffers (e.g. the persistence layer 914) when accessed.

When a table is created, the table can be specified in the store in which it is located. Table can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 914 can be responsible for durability and atomicity of transactions and can ensure that the database is restored to the most recent committed state after a restart and that transactions are either completely executed or completely undone. To achieve this goal in an efficient way, the persistence layer 914 can use a combination of write-ahead logs, shadow paging and save points. The persistence layer 914 can offer interfaces for writing and reading data and can also contain a logger 952 that manages the transaction log. Log entries can be written implicitly by the persistence layer 914 when data are written via a persistence interface or explicitly by using a log interface.

An authorization manager 954 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could for example be used to restrict access to a cube with sales data to values with dimension attributes such as region="US" and year="2010."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," or "using" above and in the claims is intended to mean, "based at least in part on," or "using at least in part" such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   listing each coordinate dimension value appearing in at least one line segment of a plurality of line segments in one of a plurality of dimensional dictionaries, each dimensional dictionary of the plurality of dimensional dictionaries corresponding to a dimension of a plurality of dimensions of a data set comprising a linestring decomposed into the plurality of line segments;

generating a representation of the linestring as a set of index vectors comprising an index vector for each dimension of the plurality of dimensions for each of a first vertex and a second vertex of the plurality of line segments, each index vector of the set of index vectors comprising a value identifier that references the coordinate dimension value in the dimensional dictionary of the plurality of dimensional dictionaries corresponding to the dimension represented by the index vector; and performing a data set operation on the data set by at least using the plurality of dimensional dictionaries to represent the linestring, wherein the data set operation comprises a join of linestrings by at least finding a plurality of line segments of the joined linestrings that intersect using the plurality of dimensional dictionaries.

2. The computer program product of claim 1, wherein the finding comprises:

defining an index cluster that comprises an interval within the one of the plurality of dimensional dictionaries, the interval including a coordinate value of one of the first vertex and the second vertex of the at least one line segment of the plurality of line segments, and identifying possibly intersecting other line segments of the plurality of line segments as those line segments for which a comparison of the index cluster with another index vector of the set of index vectors returns a true value.

3. The computer program product of claim 1, wherein the data set operation further comprises a dictionary compression operation.

4. The computer program product of claim 1, wherein the data set operation comprises a bounding box test operation.

5. The computer program product of claim 1, wherein the data set operation further comprises a polygon clipping operation.

6. The computer program product of claim 1, wherein the data set operation further comprises projecting the line segments of the linestring to a grid using a grid-join operation.

7. A system comprising:

computer hardware configured to perform operations comprising:

listing each coordinate dimension value appearing in at least one line segment of a plurality of line segments in one of a plurality of dimensional dictionaries, each dimensional dictionary of the plurality of dimensional dictionaries corresponding to a dimension of a plurality of dimensions of a data set comprising a linestring decomposed into the plurality of line segments;

generating a representation of the linestring as a set of index vectors comprising an index vector for each dimension of the plurality of dimensions for each of a first vertex and a second vertex of the plurality of line segments, each index vector of the set of index vectors comprising a value identifier that references the coordinate dimension value in the dimensional dictionary of the plurality of dimensional dictionaries corresponding to the dimension represented by the index vector; and performing a data set operation on the data set by at least using the plurality of dimensional dictionaries to represent the linestring, wherein the data set operation comprises a join of linestrings by at least finding a plurality of line segments of the joined linestrings that intersect using the plurality of dimensional dictionaries.

8. The system of claim 7, wherein the finding comprises:

defining an index cluster that comprises an interval within the one of the plurality of dimensional dictionaries, the interval including a coordinate value of one of the first vertex and the second vertex of the at least one line segment of the plurality of line segments, and identifying possibly intersecting other line segments of the plurality of line segments as those line segments for which a comparison of the index cluster with another index vector of the set of index vectors returns a true value.

9. The system of claim 7, wherein the data set operation further comprises a dictionary compression operation.

10. The system of claim 7, wherein the data set operation further comprises a bounding box test operation.

11. The system of claim 7, wherein the data set operation further comprises a polygon clipping operation.

12. The system of claim 7, wherein the data set operation further comprises projecting the line segments of the linestring to a grid using a grid-join operation.

13. The system of claim 7, wherein the computer hardware comprises:

a programmable processor; and a machine-readable medium comprising instructions that, when executed by the programmable processor, cause the programmable processor to perform at least some of the operations.

14. A computer-implemented method comprising:

listing each coordinate dimension value appearing in at least one line segment of a plurality of line segments in one of a plurality of dimensional dictionaries, each dimensional dictionary of the plurality of dimensional dictionaries corresponding to a dimension of a plurality of dimensions of a data set comprising a linestring decomposed into the plurality of line segments;

generating a representation of the linestring as a set of index vectors comprising an index vector for each dimension of the plurality of dimensions for each of a first vertex and a second vertex of the plurality of line segments, each index vector of the set of index vectors comprising a value identifier that references the coordinate dimension value in the dimensional dictionary of the plurality of dimensional dictionaries corresponding to the dimension represented by the index vector; and performing a data set operation on the data set by at least using the plurality of dimensional dictionaries to represent the linestring, wherein the data set operation comprises a join of linestrings by at least finding a plurality of line segments of the joined linestrings that intersect using the plurality of dimensional dictionaries.

15. The computer implemented method of claim 14, wherein the finding comprises:

defining an index cluster that comprises an interval within the one of the plurality of dimensional dictionaries, the interval including a coordinate value of one of the first vertex and the second vertex of the at least one line segment of the plurality of line segments, and identifying possibly intersecting other line segments of the plurality of line segments as those line segments for which a comparison of the index cluster with another index vector of the set of index vectors returns a true value.

16. The computer-implemented method of claim 14, wherein the data set operation further comprises a dictionary compression operation.

17. The computer-implemented method of claim 14, wherein the data set operation further comprises a bounding box test operation.

18. The computer-implemented method of claim 14, wherein the data set operation further comprises a polygon clipping operation.

19. The computer-implemented method of claim 14, wherein the data set operation further comprises projecting the line segments of the linestring to a grid using a grid-join operation.

20. The computer-implemented method of claim 14, wherein at least one of the processing, the listing, the representing, and the performing is performed by at least one system comprising computer hardware.

* * * * *